(12) United States Patent
Balensiefer et al.

(10) Patent No.: US 7,360,830 B2
(45) Date of Patent: Apr. 22, 2008

(54) JUVENILE VEHICLE SEAT BASE WITH CUP HOLDER

(75) Inventors: Eugene R. Balensiefer, Seymour, IN (US); Philip W. Burbrink, Columbus, IN (US); Ronald F. Munn, Hope, IN (US); William Horton, Hope, IN (US)

(73) Assignee: Cosco Management, Inc., Wilmington, DE (US)

( * ) Notice: Subject to any disclaimer, the term of this patent is extended or adjusted under 35 U.S.C. 154(b) by 128 days.

(21) Appl. No.: 10/998,387

(22) Filed: Nov. 29, 2004

(65) Prior Publication Data

US 2006/0113826 A1    Jun. 1, 2006

(51) Int. Cl.
*A47C 7/62* (2006.01)
*A47D 1/00* (2006.01)
*B60N 2/26* (2006.01)

(52) U.S. Cl. .................................. 297/188.08

(58) Field of Classification Search ........... 297/188.08, 297/188.14, 188.18, 411.2, 411.4, 411.41
See application file for complete search history.

(56) References Cited

U.S. PATENT DOCUMENTS

| | | | |
|---|---|---|---|
| 909,453 A * | 1/1909 | Pullman | 297/188.14 |
| 1,702,955 A * | 2/1929 | Zaday | 297/111 |
| 2,052,817 A | 9/1936 | Evans | |
| 2,122,628 A | 7/1938 | Tracy | |
| 2,185,907 A | 1/1940 | Alexander | |
| 2,457,294 A | 12/1948 | Wood | |
| 2,684,759 A | 7/1954 | Freeman | |
| 3,083,053 A * | 3/1963 | Dorsey | 297/153 |
| 3,148,636 A | 9/1964 | Bloomquist et al. | |
| 3,475,052 A | 10/1969 | Kaposi | |
| 3,690,724 A | 9/1972 | Douglas et al. | |
| 3,698,675 A | 10/1972 | Lerew et al. | |
| 3,850,296 A | 11/1974 | Hirata et al. | |
| 4,174,866 A | 11/1979 | Rhyan | |
| 4,191,420 A * | 3/1980 | Fassett et al. | 312/235.6 |
| 4,521,052 A * | 6/1985 | Cone | 297/3 |
| 4,591,206 A | 5/1986 | Pribble | |
| 4,606,576 A | 8/1986 | Jones | |
| 4,659,099 A | 4/1987 | Malone | |
| 4,662,676 A | 5/1987 | Havelock | |
| 4,825,590 A | 5/1989 | Cullinane | |
| 4,858,869 A | 8/1989 | Stang | |
| 4,865,237 A | 9/1989 | Allen | |
| 4,909,394 A | 3/1990 | Stewart | |
| 4,928,876 A | 5/1990 | Marshall | |
| 4,972,781 A | 11/1990 | Montgomery et al. | |
| 5,004,296 A * | 4/1991 | Ziegenfuss, Jr. | 297/188.14 |
| 5,010,826 A | 4/1991 | Kudlac | |
| 5,042,770 A | 8/1991 | Louthan | |
| 5,072,909 A | 12/1991 | Huang | |
| 5,205,452 A | 4/1993 | Mankey | |

(Continued)

OTHER PUBLICATIONS

Official Action dated Dec. 10, 2007 (U.S. Appl. No. 10/999,023, filed Nov. 29, 2004).

*Primary Examiner*—Joe Edell
(74) *Attorney, Agent, or Firm*—Barnes & Thornburg LLP (57) ABSTRACT

A juvenile vehicle seat includes first and second cup holders and a seat bottom located between the first and second cup holders. The juvenile vehicle seat is adapted to be mounted in a restrained position on a seat in a vehicle.

30 Claims, 4 Drawing Sheets

U.S. PATENT DOCUMENTS

| | | | |
|---|---|---|---|
| 5,279,452 A | | 1/1994 | Huynh |
| 5,332,286 A | * | 7/1994 | Atherton et al. ........ 297/256.11 |
| 5,361,950 A | | 11/1994 | Signal et al. |
| 5,427,292 A | | 6/1995 | Rousch |
| 5,458,394 A | | 10/1995 | Nichols et al. |
| 5,460,102 A | | 10/1995 | Pasmanick |
| 5,503,297 A | | 4/1996 | Frankel |
| 5,522,527 A | | 6/1996 | Tsai |
| 5,533,785 A | * | 7/1996 | Gould ..................... 297/250.1 |
| 5,558,391 A | | 9/1996 | Chavous |
| 5,560,680 A | * | 10/1996 | Salvador et al. ........ 297/256.15 |
| D376,917 S | | 12/1996 | Kain |
| 5,586,800 A | | 12/1996 | Triplett |
| 5,662,378 A | | 9/1997 | Carruth |
| 5,685,604 A | | 11/1997 | Kain |
| 5,720,226 A | | 2/1998 | Padovano |
| 5,813,579 A | | 9/1998 | Hendrickson |
| 5,845,967 A | | 12/1998 | Kane et al. |
| 5,865,124 A | * | 2/1999 | Wroe .......................... 108/26 |
| 5,865,412 A | | 2/1999 | Mason |
| 5,918,550 A | | 7/1999 | Weir et al. |
| 5,964,502 A | | 10/1999 | Stephens |
| 5,975,342 A | | 11/1999 | Bradeen et al. |
| 5,997,092 A | | 12/1999 | Slaven |
| D424,819 S | * | 5/2000 | Galati et al. ................. D6/336 |
| 6,065,603 A | | 5/2000 | Filice et al. |
| 6,079,780 A | | 6/2000 | Bapst |
| 6,131,732 A | | 10/2000 | Schneider |
| 6,216,605 B1 | | 4/2001 | Chapman |
| 6,302,033 B1 | | 10/2001 | Roudebush |
| 6,336,682 B1 | | 1/2002 | Rosko |
| 6,360,885 B1 | | 3/2002 | Krueger et al. |
| 6,394,265 B1 | | 5/2002 | Tsao |
| 6,422,654 B1 | | 7/2002 | Grove |
| 6,467,839 B1 | | 10/2002 | Kain |
| 6,478,372 B1 | | 11/2002 | Lemmeyer et al. |
| 6,488,339 B1 | | 12/2002 | Finner et al. |
| 6,533,233 B2 | | 3/2003 | Thomas |
| 6,550,862 B2 | | 4/2003 | Kain |
| 6,592,180 B2 | | 7/2003 | Combs |
| 6,607,243 B2 | | 8/2003 | Kain |
| 6,612,649 B2 | | 9/2003 | Kain |
| 6,623,074 B2 | | 9/2003 | Asbach et al. |
| 6,682,143 B2 | | 1/2004 | Amirault et al. |
| 6,908,151 B2 | * | 6/2005 | Meeker et al. ............ 297/250.1 |
| 6,997,509 B2 | * | 2/2006 | Kain ....................... 297/250.1 |
| 7,021,710 B2 | * | 4/2006 | Kain et al. .............. 297/256.11 |
| 2002/0096916 A1 | | 7/2002 | Combs |
| 2002/0149240 A1 | * | 10/2002 | Minneman et al. .... 297/188.01 |
| 2003/0137168 A1 | | 7/2003 | Kain |
| 2003/0151282 A1 | * | 8/2003 | Williams et al. ......... 297/250.1 |
| 2004/0061366 A1 | | 4/2004 | Meeker et al. |
| 2004/0070244 A1 | | 4/2004 | Williams et al. |
| 2004/0090094 A1 | | 5/2004 | Williams et al. |
| 2004/0108758 A1 | | 6/2004 | Eastman et al. |

* cited by examiner

JUVENILE VEHICLE SEAT BASE WITH CUP HOLDER

BACKGROUND

The present disclosure relates to juvenile vehicle seats, and, in particular, to cup holders for vehicle seats. More particularly, the present disclosure relates to cup holders for juvenile vehicle seat bases.

SUMMARY

A juvenile vehicle seat in accordance with the present disclosure includes a seat base formed to include a seat bottom located between two spaced-apart, fixed-position cup holders. The seat base is monolithic and made by molding a suitable plastics material.

In illustrative embodiments, the cup holders are maintained in elevated positions relative to the seat bottom. A first block included in the seat base is used to support a first of the cup holders in an elevated position along one side of the seat bottom. A second block included in the seat base is used to support a second of the cup holders in an elevated position along another side of the seat bottom.

Additional features of the disclosure will become apparent to those skilled in the art upon consideration of the following detailed description of illustrative embodiments exemplifying the best mode of carrying out the disclosure as presently perceived.

BRIEF DESCRIPTION OF THE DRAWINGS

The detailed description particularly refers to the following figures in which.

DETAILED DESCRIPTION

Figure 1:
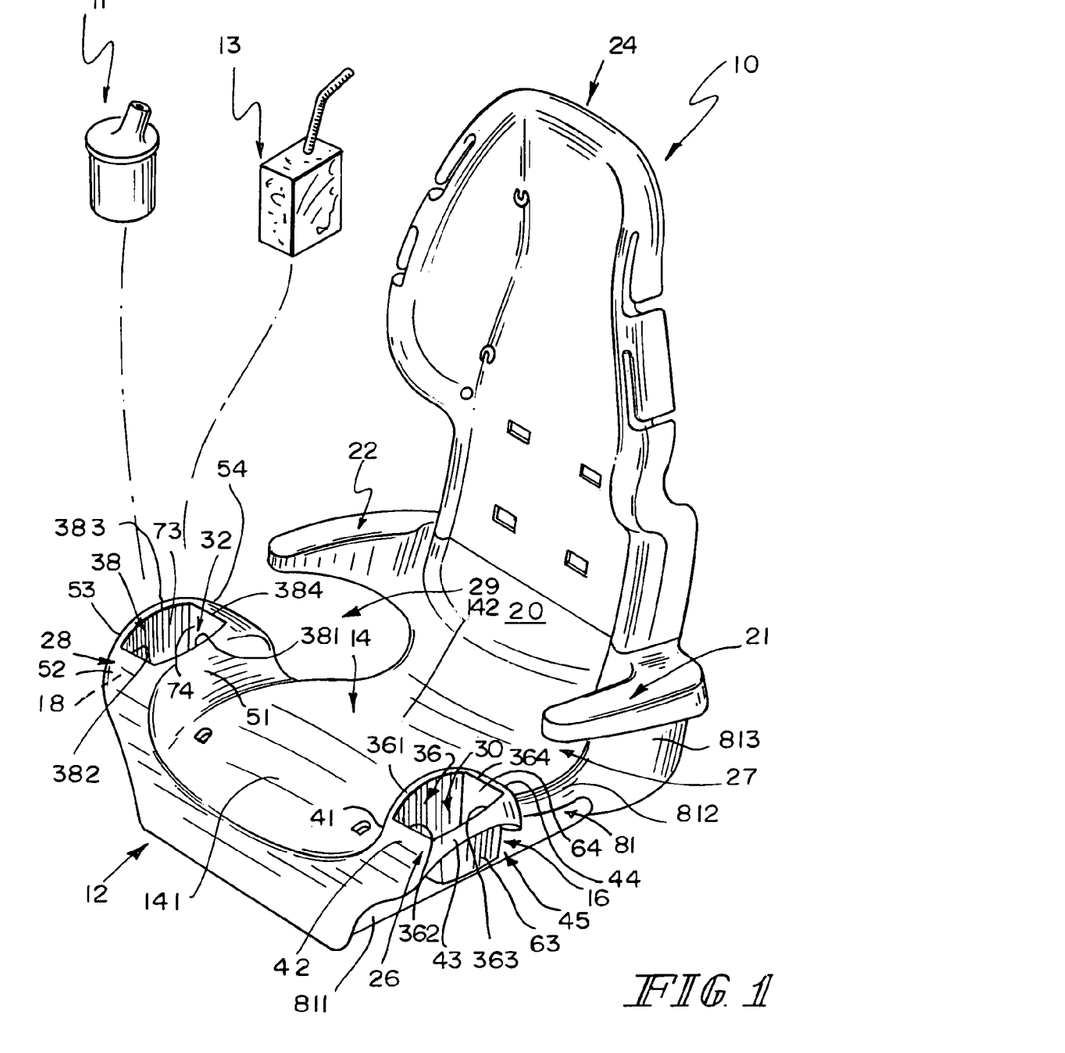
FIG. 1 is a perspective view of a juvenile vehicle seat in accordance with the disclosure showing a seat base formed to include spaced-apart first and second cup holders.
Figure 2:
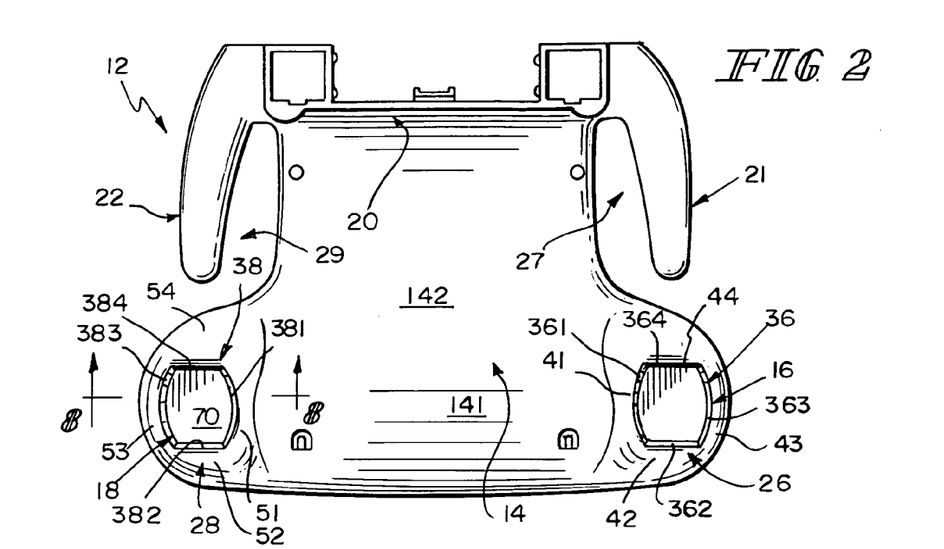
FIG. 2 is a top plan view of the seat base of FIG. 1.
Figure 3:
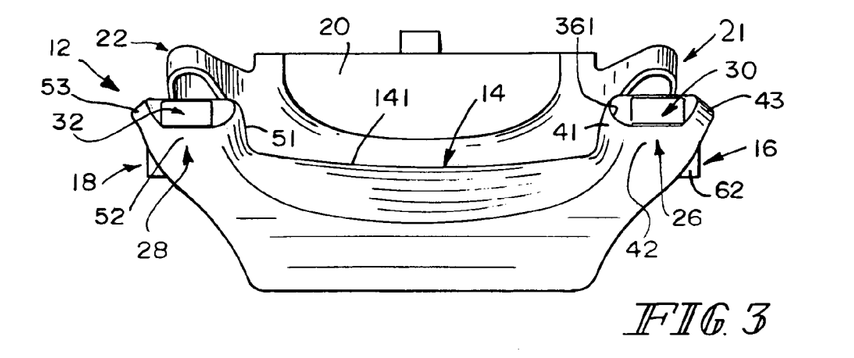
FIG. 3 is a front elevation view of the seat base of FIG. 1.

A juvenile vehicle seat 10 includes a seat base 12 formed to include a seat bottom 14 located between two spaced-apart, fixed-position cup holders 16, 18 as suggested in FIGS. 1-3. In the illustrated embodiment, seat base 12 is monolithic and made by molding a suitable plastics material.

In the illustrated embodiment, seat base 12 includes a lower seat back 20 arranged to extend upwardly from seat bottom 14, a first armrest 21 coupled to a first side of lower seat back 20, and a second armrest 22 coupled to a second side of lower seat back 20. Juvenile vehicle seat 10 also includes a backrest 24 coupled to and arranged to extend upwardly from lower seat back 20 of seat base 12 as suggested in FIG. 1. It is within the scope of this disclosure to integrate backrest 24 with seat base 12 to form a monolithic seat 10.

Seat base 12 includes a first block 26 and a second block 28 arranged to lie in spaced-apart relation to first block 26 as suggested in FIGS. 1-3. Seat bottom 14 is arranged to lie between first and second blocks 26, 28.

First cup holder 16 is coupled to first block 26 as shown, for example, in FIGS. 1-4, 6, and 7. First block 26 is formed to include an interior edge 36 defining an opening into an interior region 30 of first cup holder 16. In the illustrated embodiment, first block 26 includes an inner face 41 extending upwardly from seat bottom 20 and terminating along interior edge 36 to elevate the opening into interior region 30 of first cup holder 16 to a predetermined height above seat bottom 14 as suggested in FIGS. 1 and 3.

Figure 4:
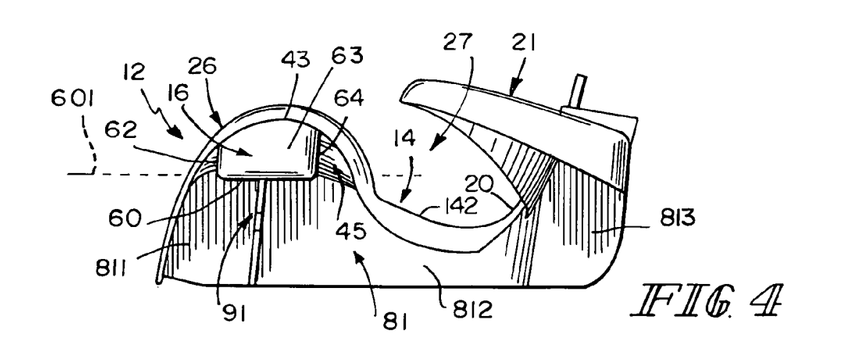
FIG. 4 is a right-side elevation view of the seat base of FIG. 1.
Figure 7:
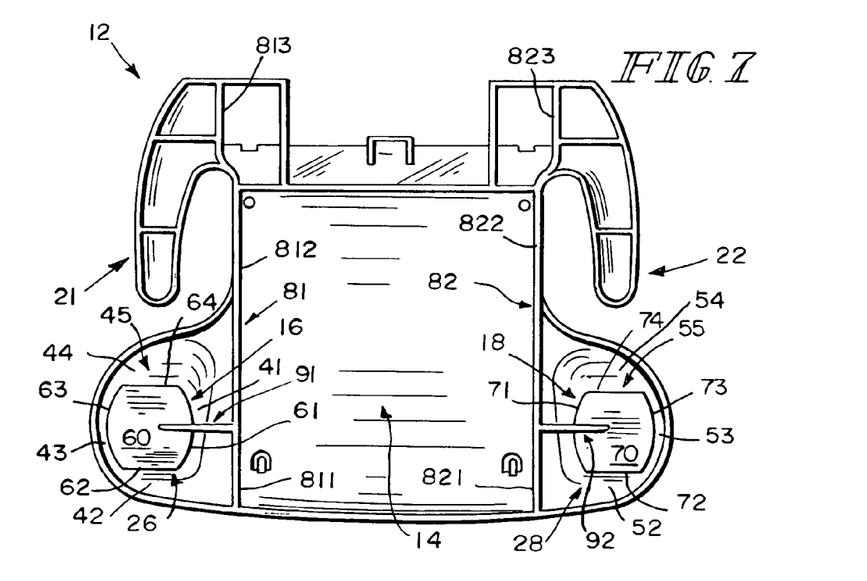
FIG. 7 is a bottom view of the seat base of FIG. 1.

First block 26 is formed to include a downwardly opening cavity 45 as suggested in FIGS. 4 and 7. First cup holder 26 is arranged to extend downwardly from a first portion 361 of interior edge 36 of first block 26 to lie in downwardly opening cavity 45 as suggested in FIGS. 1, 4, and 7.

As suggested in FIGS. 1 and 2, first block 26 includes, in series, inner face 41, front face 42, outer rim face 43, and rear face 44. These faces 41-44 cooperate to define interior edge 36 of fist block 26 and form a shell coupled to first cup holder 16 at interior edge 36 and configured to define downwardly opening cavity 45. Front face 42 is coupled to inner face 41 to face away from backrest 24 and is configured to define a second portion 362 of interior edge 36 of first block 26. Outer rim face 43 is coupled to front face 42 to face away from seat bottom 14 and is formed to define a third portion 363 of interior edge 36 of first block 26. Rear face 44 is coupled to outer rim face 43 and to inner face 41 to face toward backrest 24 and is formed to define a fourth portion 364 of interior edge 36 of first block 26.

First cup holder 16 includes a floor 60 and walls 61, 62, 63, and 64 extending upwardly from floor 60 to interior edge 36 of first block 26 as suggested in FIGS. 1, 2, and 7. An inner side wall 61 extends from floor 60 to first portion 361 of interior edge 36. A front wall 62 extends from floor 60 to second portion 362 of interior edge 36. An outer side wall 63 extends from floor 60 to third portion 363 of interior edge 36. A rear wall 64 extends from floor 60 to fourth portion 364 of interior edge 36. In the illustrated embodiment, inner and outer side walls 61, 63 are concave surfaces arranged to confront one another so that first cup holder 16 is adapted to receive, for example, either a cup 11 or a juice box 13.

Second cup holder 18 is coupled to second block 28 as shown, for example, in FIGS. 1-3 and 5-8. Second block 28 is formed to include an interior edge 38 defining an opening into interior region 32 of second cup holder 18. In the illustrated embodiment, second block 28 includes an inner face 51 extending upwardly from seat bottom 20 and terminating along interior edge 38 to elevate the opening into interior region 32 of second cup holder 18 to a predetermined height above seat bottom 14 as suggested in FIGS. 1 and 3.

Figure 5:
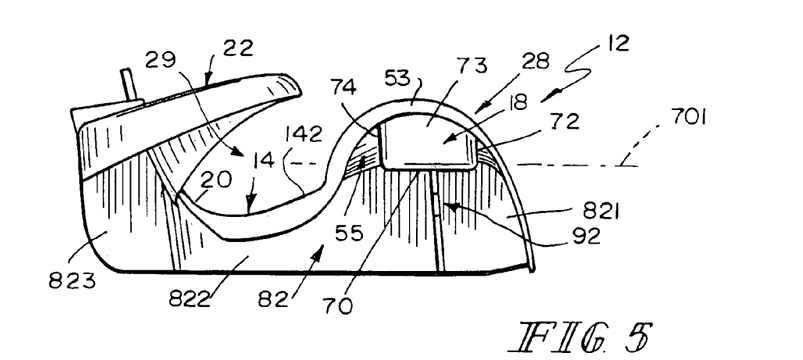
FIG. 5 is a left-side elevation view of the seat base of FIG. 1.
Figure 6:
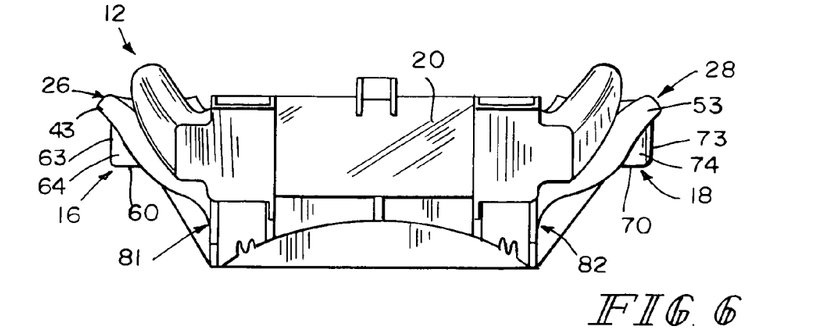
FIG. 6 is a rear elevation view of the seat base of FIG. 1.
Figure 8:
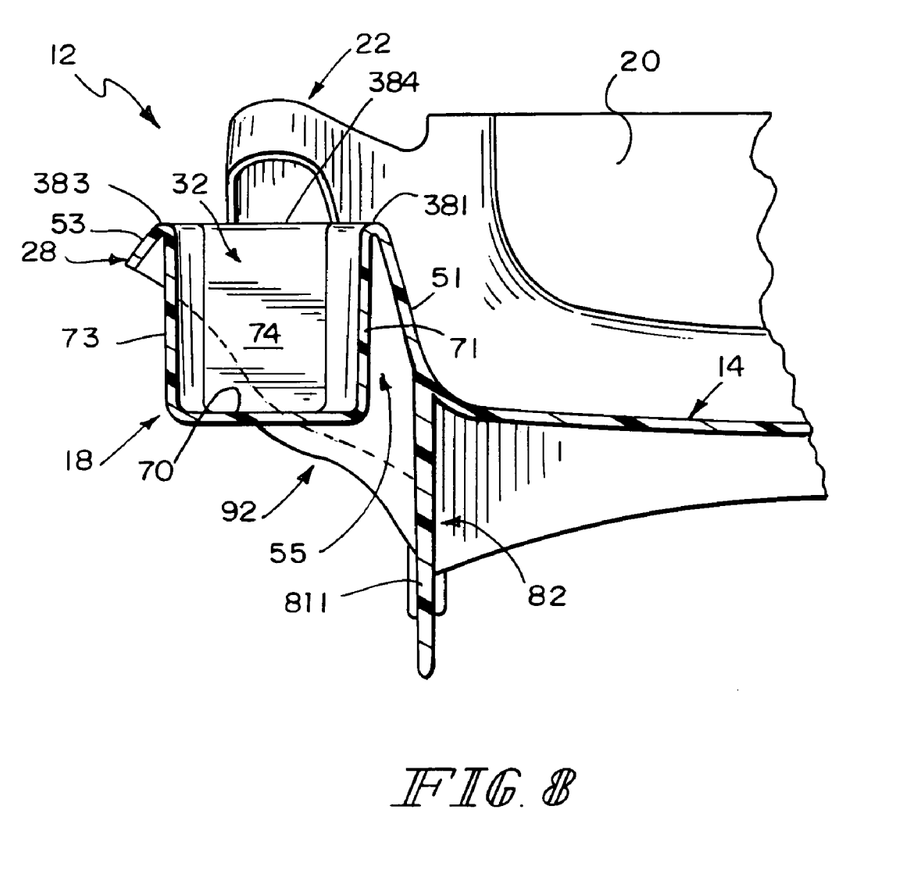
FIG. 8 is a partial sectional view taken along line 8-8 of FIG. 2.

Second block 28 is formed to include a downwardly opening cavity 55 as suggested in FIGS. 5, 7, and 8. Second cup holder 28 is arranged to extend downwardly from a first portion 381 of interior edge 38 of second block 28 to lie in downwardly opening cavity 55 as suggested in FIGS. 5, 7, and 8.

As suggested in FIGS. 1 and 2, second block 28 includes, in series, inner face 51, front face 52, outer rim face 53, and rear face 54. These faces 51-54 cooperate to define interior edge 38 of second block 28 and form a shell coupled to second cup holder 18 at interior edge 38 and configured to define downwardly opening cavity 55. Front face 52 is coupled to inner face 51 to face away from backrest 24 and is configured to define a second portion 382 of interior edge 38 of second block 28. Outer face rim 53 is coupled to front face 52 to face away from seat bottom 14 and is formed to define a third portion 383 of interior edge 38 of second block 28. Rear face 54 is coupled to outer rim face and to inner face 51 to face toward backrest 24 and is formed to define a fourth portion 384 of interior edge 38 of second block 28.

Second cup holder 18 includes a floor 70 and walls 71, 72, 73, and 74 extending upwardly from floor 70 to interior edge 38 of second block 28 as suggested in FIGS. 1, 2, 7, and 8. An inner side wall 71 extends from floor 70 to first portion 381 of interior edge 38. A front wall 72 extends from floor 70 to second portion 382 of interior edge 38. An outer side wall 73 extends from floor 70 to third portion 383 of interior edge 38. A rear wall 74 extends from floor 70 to fourth portion 384 of interior edge 38. In the illustrated embodiment, inner and outer side walls 71, 73 are concave surfaces arranged to confront one another while front and rear walls 72, 74 are flat surfaces arranged to confront one another so that second cup holder 18 is adapted to receive, for example, either a cup 11 or a juice box 13 as suggested in FIG. 1.

As shown best in FIGS. 4, 5, and 7, seat base 12 further includes spaced-apart first and second bottom support panels 81, 82. First bottom support panel 81 is arranged to lie under seat bottom 14 along a first side edge thereof and is coupled to an underside of seat bottom 14. Second bottom support panel 82 is arranged to lie under seat bottom 14 along a second side edge thereof and is coupled to the underside of seat bottom 14. Second bottom support panel 82 is arranged to lie under seat bottom 14 along a second side edge thereof and is coupled to the underside of seat bottom 14. First and second cup holders 16, 18 are arranged to lie in spaced-apart relation to one another to locate seat bottom 14 and first and second bottom support panels 81, 82 therebetween as shown best in FIG. 7. In the illustrated embodiment, each panel 81, 82 is oriented to lie in a vertical plane.

First and second rigidifying ribs 91, 92 are also included in seat base 12 as suggested in FIG. 7. First rigidifying rib 91 is arranged to lie in downwardly opening cavity 45 formed in first block 26 and is coupled to first bottom support panel 81, inner face 41 of first block 26, and inner side wall 61 and floor 60 of first cup holder 16 as shown, for example, in FIGS. 4 and 7. Second rigidifying rib 92 is arranged to lie in downwardly opening cavity 55 formed in second block 28 and is coupled to second bottom support panel 82, inner face 51 of second block 28, and inner side wall 71 and floor 70 of second cup holder 18 as shown, for example, in FIGS. 5, 7, and 8. First rigidifying rib 91 is configured to provide means for anchoring first cup holder 16 in a fixed position relative to seat bottom 14 and first block 26. Second rigidifying rib 92 is configured to provide means for anchoring second cup holder 18 in a fixed position relative to seat bottom 14 and second block 28.

As suggested in FIG. 1, seat bottom 14 includes a raised front portion 141 located between first and second blocks 26, 28 and an inclined lower portion 142 located between raised front portion 141 and lower seat back 20. Inclined lower portion 20 is arranged to slope downwardly from raised front portion 141 to lower seat back 20. As suggested in FIG. 4, floor 60 of first cup holder 16 is arranged to lie in a plane 601 that lies above a substantial portion of inclined lower portion 142 of seat bottom 14. As suggested in FIG. 5, floor 70 of second cup holder 18 is arranged to lie in a plane 701 that lies above a substantial portion of inclined lower portion 142 of seat bottom 14.

As suggested in FIGS. 1, 2, and 4, first armrest 21 is coupled to a first side of lower seat back 20. First armrest 21 is arranged to extend forwardly toward first block 26 and to cooperate with first block 26 to define therebetween belt receiver means 27 for receiving a vehicle seat belt (not shown) passing over seat bottom 14 and under first armrest 21 so that an occupant (not shown) seated on seat bottom 14 is restrained from movement relative to seat bottom 14.

As suggested in FIGS. 1, 2, and 5, second armrest 22 is coupled to a second side of lower seat back 20. Second armrest 22 is arranged to extend forwardly toward second block 28 and to cooperate with second block 28 to define therebetween belt receiver means 29 for receiving a vehicle seat belt (not shown) passing over seat bottom 14 and under second armrest 22 so that an occupant (not shown) seated on seat bottom 14 is restrained from movement relative to seat bottom 14.

As suggested in FIGS. 4 and 7, first bottom support panel 81 includes a forward portion 811 coupled to an underside of raised front portion 141 of seat bottom 14 and arranged to lie adjacent to first cup holder 16 and coupled to first rigidifying rib 91. First bottom support panel 81 also includes a rearward portion 813 arranged to extend in a rearward direction away from seat bottom 14 and first block 26 and coupled to first armrest 21. First bottom support panel 81 also includes a central portion 812 located between forward and rearward portions 811, 813 to underlie belt receiver means 27 and coupled to inclined lower portion 142 of seat bottom 14.

As suggested in FIGS. 5 and 7, second bottom support panel 82 includes a forward portion 821 coupled to an underside of raised front portion 141 of seat bottom 14 and arranged to lie adjacent to second cup holder 16 and coupled to second rigidifying rib 92. Second bottom support panel 82 also includes a rearward portion 823 arranged to extend in a rearward direction away from seat bottom 14 and second block 26 and coupled to second armrest 22. Second bottom support panel 82 also includes a central portion 822 located between forward and rearward portions 821, 823 to underlie belt receiver means 29 and coupled to inclined lower portion 142 of seat bottom 14.

The invention claimed is:

1. A juvenile vehicle seat comprising
   a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;
   wherein the first block includes an inner face extending upwardly from the seat bottom and terminating along the interior edge of the first block to elevate the first block's opening into the interior region of the first cup holder to a predetermined height above the seat bottom, the inner face running along a substantial portion of the interior edge; and
   wherein the first block is formed to include a downwardly-facing opening cavity defined at least by the inner face of the first block and the first cup holder is arranged to extend downwardly from a first portion of the interior edge of the first block to lie in the downwardly-facing opening cavity.

2. The seat of claim 1, further comprising a backrest extending upwardly from the seat bottom and wherein the first block includes in series the inner face, a front face coupled to the inner face to face away from the backrest and configured to define a second portion of the interior edge of the first block, an outer rim face coupled to the front face to face away from the seat bottom and formed to define a third portion of the interior edge of the first block, and a rear face coupled to the outer rim face and inner face to face toward the backrest and formed to define a fourth portion of the interior edge of the first block, and wherein the inner face, front face, outer rim face, and rear face cooperate to define the interior edge of the first block and form a shell coupled to the first cup holder at the interior edge and configured to define the downwardly-facing opening cavity.

3. The seat of claim 1, wherein the first cup holder includes an inner side wall coupled to the inner face of the first block at the first portion of the interior edge of the first block and arranged to extend away from the inner face of the first block and the seat base further includes a rigidifying rib lying in the downwardly-facing opening cavity and extending between the inner face of the first block and the inner side wall of the first cup holder.

4. The seat of claim 1, wherein the first cup holder includes a floor and the seat base further includes a rigidifying rib lying in the downwardly opening cavity and extending between the inner face of the first block and an underside of the floor.

5. The seat of claim 1, wherein the monolithic seat base further includes a vertical bottom support panel arranged to lie under the seat bottom and coupled to an underside of the seat bottom and to the inner face of the first block and a rigidifying rib arranged to lie under the inner face of the first block and coupled to the vertical bottom support panel and to the first cup holder.

6. The seat of claim 5, wherein the rigidifying rib is coupled to the inner face of the first block.

7. The seat of claim 5, wherein the first cup holder includes a floor and walls extending upwardly from the floor to the interior edge of the first block and the rigidifying rib is coupled to one of the walls of the first cup holder.

8. The seat of claim 5, wherein the first cup holder includes a floor and walls extending upwardly from the floor to the interior edge of the first block and the rigidifying rib is coupled to the floor of the first cup holder.

9. The seat of claim 5, wherein the first cup holder includes a floor and walls extending upwardly from the floor to the interior edge of the first block and the rigidifying rib is coupled to one of the walls of the first cup holder and to the floor of the first cup holder.

10. The seat of claim 1, wherein the first cup holder includes a floor and walls extending upwardly from the floor to the interior edge of the first block and the floor of the first cup holder is arranged to lie in a plane that lies above a portion of the seat bottom.

11. The seat of claim 10, wherein the monolithic seat base is formed to include a lower seat back arranged to extend upwardly from the seat bottom, the seat bottom includes a raised front portion located between the first and second blocks and an inclined rear portion located between the raised front portion and the lower seat back, and the floor of the first cup holder is arranged to lie in a plane that lies above a substantial portion of the inclined rear portion of the seat bottom.

12. The seat of claim 11, wherein the monolithic seat base further includes a first armrest coupled to a first side of the lower seat back and arranged to extend forwardly toward the first block and a second armrest coupled to a second side of the lower seat back and arranged to extend forwardly toward the second block.

13. The seat of claim 1, wherein the monolithic seat base includes a first armrest arranged to extend toward the first block and means lying between the first arm rest and the first block for receiving a vehicle seat belt passing over the seat bottom and under the first armrest so that an occupant seated on the seat bottom is restrained from movement relative to the seat bottom.

14. The seat of claim 13, wherein the monolithic seat base further includes a first bottom support panel arranged to extend under the seat bottom and the first bottom support panel includes a forward portion coupled to an underside of the seat bottom and arranged to lie adjacent to the first cup holder, a rearward portion arranged to extend in a rearward direction away from the seat bottom and the first block and coupled to the first armrest, and a central portion located between the forward and rearward portions to underlie the belt receiver means and coupled to the seat bottom.

15. The seat of claim 1, wherein the monolithic seat base further includes a first armrest coupled to a first side of the lower seat back and arranged to extend forwardly toward the first block and a second armrest coupled to a second side of the lower seat back and arranged to extend forwardly toward the second block.

16. The seat of claim 1, wherein the monolithic seat base further includes a first bottom support panel arranged to lie under the seat bottom and coupled to an underside of the seat bottom and a first rigidifying rib coupled to the first block, first cup holder, and first bottom support panel.

17. The seat of claim 16, wherein the first cup holder includes a floor and walls extending upwardly from the floor to the interior edge of the first block and the first rigidifying rib is coupled to one of the side walls and the floor of the first cup holder.

18. The seat of claim 16, wherein the monolithic seat base further includes a second bottom support panel arranged to lie under the seat bottom in spaced-apart relation to the first bottom support panel and coupled to an underside of the seat bottom and a second rigidifying rib coupled to the second block, second cup holder, and the second bottom support panel.

19. The seat of claim 18, wherein the second cup holder includes a floor and walls extending upwardly from the floor to the interior edge of the second block and the second rigidifying rib is coupled to one of the side walls and the floor of the second cup holder.

20. A juvenile vehicle seat for a child comprising
a monolithic seat base to accommodate the child including a seat bottom, a first bottom support panel arranged to lie under the seat bottom along a first side edge thereof and coupled to an underside of the seat bottom, a second bottom support panel arranged to lie under the seat bottom along a second side edge thereof and in spaced-apart relation to the first bottom support panel and coupled to the underside of the seat bottom, first and second cup holders arranged to lie in spaced-apart relation to one another to locate the seat bottom and the first and second bottom support panels therebetween, a first rigidifying rib coupled to the first bottom support panel and to the first cup holder to anchor the first cup holder in a fixed position relative to the seat bottom, and a second rigidifying rib coupled to the second bottom support panel and to the second cup holder to anchor the second cup holder in a fixed position relative to the seat bottom, at least a portion of the rigidifying ribs being located below the seat bottom.

21. The seat of claim 20, wherein the first cup holder includes a floor and a wall extending upwardly from the floor and terminating at an opening into an interior region of the first cup holder, the second cup holder includes a floor and a wall extending upwardly from the floor of the second cup holder and terminating at an opening into an interior region of the second cup holder, the first rigidifying rib is coupled to the wall of the first cup holder, and the second rigidifying rib is coupled to the wall of the second cup holder.

22. The seat of claim 21, wherein the first rigidifying rib is also coupled to the floor of the first cup holder and the second rigidifying rib is also coupled to the floor of the second cup holder.

23. The seat of claim 20, wherein the first cup holder includes a floor and a wall extending upwardly from the floor and terminating at an opening into an interior region of the first cup holder, the second cup holder includes a floor and a wall extending upwardly from the floor of the second cup holder and terminating at an opening into an interior region of the second cup holder, the first rigidifying rib is coupled to the floor of the first cup holder, and the second rigidifying rib is coupled to the floor of the second cup holder.

24. A juvenile vehicle seat comprising
a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;
wherein the first block includes an inner face extending upwardly from the seat bottom and terminating along the interior edge of the first block to elevate the opening of the first block into the interior region of the first cup holder to a predetermined height above the seat bottom;
wherein the first block is formed to include a downwardly-facing opening cavity defined at least by the inner face of the first block and the first cup holder is arranged to extend downwardly from a first portion of the interior edge of the first block to lie in the downwardly-facing opening cavity; and
wherein the first cup holder includes an inner side wall coupled to the inner face of the first block at the first portion of the interior edge of the first block and arranged to extend away from the inner face of the first block and the seat base further includes a rigidifying rib lying in the downwardly opening cavity and extending between the inner face of the first block and the inner side wall of the first cup holder.

25. A juvenile vehicle seat comprising
a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;
wherein the first block includes an inner face extending upwardly from the seat bottom and terminating along the interior edge of the first block to elevate the opening of the first block into the interior region of the first cup holder to a predetermined height above the seat bottom;
wherein the first block is formed to include a downwardly-facing opening cavity defined at least by the inner face of the first block and the first cup holder is arranged to extend downwardly from a first portion of the interior edge of the first block to lie in the downwardly-facing opening cavity; and
wherein the first cup holder includes a floor and the seat base further includes a rigidifying rib lying in the downwardly opening cavity and extending between the inner face of the first block and an underside of the floor.

26. A juvenile vehicle seat comprising
a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;
wherein the first block includes an inner face extending upwardly from the seat bottom and terminating along the interior edge of the first block to elevate the opening of the first block into the interior region of the first cup holder to a predetermined height above the seat bottom;
wherein the first block is formed to include a downwardly-facing opening cavity defined at least by the inner face of the first block and the first cup holder is arranged to extend downwardly from a first portion of the interior edge of the first block to lie in the downwardly-facing opening cavity; and
wherein the monolithic seat base further includes a vertical bottom support panel arranged to lie under the seat bottom and coupled to an underside of the seat bottom and to the inner face of the first block and a rigidifying rib arranged to lie under the inner face of the first block and coupled to the vertical bottom support panel and to the first cup holder.

27. A juvenile vehicle seat comprising
a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;
wherein the first block includes an inner face extending upwardly from the seat bottom and terminating along the interior edge of the first block to elevate the opening of the first block into the interior region of the first cup holder to a predetermined height above the seat bottom;

wherein the first block is formed to include a downwardly-facing opening cavity defined at least by the inner face of the first block and the first cup holder is arranged to extend downwardly from a first portion of the interior edge of the first block to lie in the downwardly-facing opening cavity; and wherein the monolithic seat base includes a first armrest arranged to extend toward the first block and to cooperate with the first block to define therebetween belt receiver means for receiving a vehicle seat belt passing over the seat bottom and under the first armrest so that an occupant seated on the seat bottom is restrained from movement relative to the seat bottom.

28. A juvenile vehicle seat comprising a monolithic seat base including a first block, a second block arranged to lie in spaced-apart relation to the first block, a seat bottom arranged to lie between the first and second blocks, a first cup holder formed to include an interior region and coupled to the first block, and a second cup holder formed to include an interior region and coupled to the second block, the first block being formed to include an interior edge defining an opening into the interior region of the first cup holder, the second block being formed to include an interior edge defining an opening into the interior region of the second cup holder;

wherein the first block includes an inner face extending upwardly from the seat bottom and terminating along the interior edge of the first block to elevate the opening of the first block into the interior region of the first cup holder to a predetermined height above the seat bottom;

wherein the first block is formed to include a downwardly-facing opening cavity defined at least by the inner face of the first block and the first cup holder is arranged to extend downwardly from a first portion of the interior edge of the first block to lie in the downwardly-facing opening cavity; and wherein the monolithic seat base further includes a first bottom support panel arranged to lie under the seat bottom and coupled to an underside of the seat bottom and a first rigidifying rib coupled to the first block, first cup holder, and first bottom support panel.

29. A juvenile vehicle seat comprising a monolithic seat base including a seat bottom, a first bottom support panel arranged to lie under the seat bottom along a first side edge thereof and coupled to an underside of the seat bottom, a second bottom support panel arranged to lie under the seat bottom along a second side edge thereof and in spaced-apart relation to the first bottom support panel and coupled to the underside of the seat bottom, first and second cup holders arranged to lie in spaced-apart relation to one another to locate the seat bottom and the first and second bottom support panels therebetween, a first rigidifying rib coupled to the first bottom support panel and to the first cup holder to anchor the first cup holder in a fixed position relative to the seat bottom, and a second rigidifying rib coupled to the second bottom support panel and to the second cup holder to anchor the second cup holder in a fixed position relative to the seat bottom, at least a portion of the rigidifying ribs being located below the seat bottom; and wherein the first cup holder includes a floor and a wall extending upwardly from the floor and terminating at an opening into an interior region of the first cup holder, the second cup holder includes a floor and a wall extending upwardly from the floor of the second cup holder and terminating at an opening into an interior region of the second cup holder, the first rigidifying rib is coupled to the wall of the first cup holder, and the second rigidifying rib is coupled to the wall of the second cup holder.

30. A juvenile vehicle seat comprising a monolithic seat base including a seat bottom, a first bottom support panel arranged to lie under the seat bottom along a first side edge thereof and coupled to an underside of the seat bottom, a second bottom support panel arranged to lie under the seat bottom along a second side edge thereof and in spaced-apart relation to the first bottom support panel and coupled to the underside of the seat bottom, first and second cup holders arranged to lie in spaced-apart relation to one another to locate the seat bottom and the first and second bottom support panels therebetween, a first rigidifying rib coupled to the first bottom support panel and to the first cup holder to anchor the first cup holder in a fixed position relative to the seat bottom, and a second rigidifying rib coupled to the second bottom support panel and to the second cup holder to anchor the second cup holder in a fixed position relative to the seat bottom, at least a portion of the rigidifying ribs being located below the seat bottom; and wherein the first cup holder includes a floor and a wall extending upwardly from the floor and terminating at an opening into an interior region of the first cup holder, the second cup holder includes a floor and a wall extending upwardly from the floor of the second cup holder and terminating at an opening into an interior region of the second cup holder, the first rigidifying rib is coupled to the floor of the first cup holder, and the second rigidifying rib is coupled to the floor of the second cup holder.

* * * * *